Figure 1:
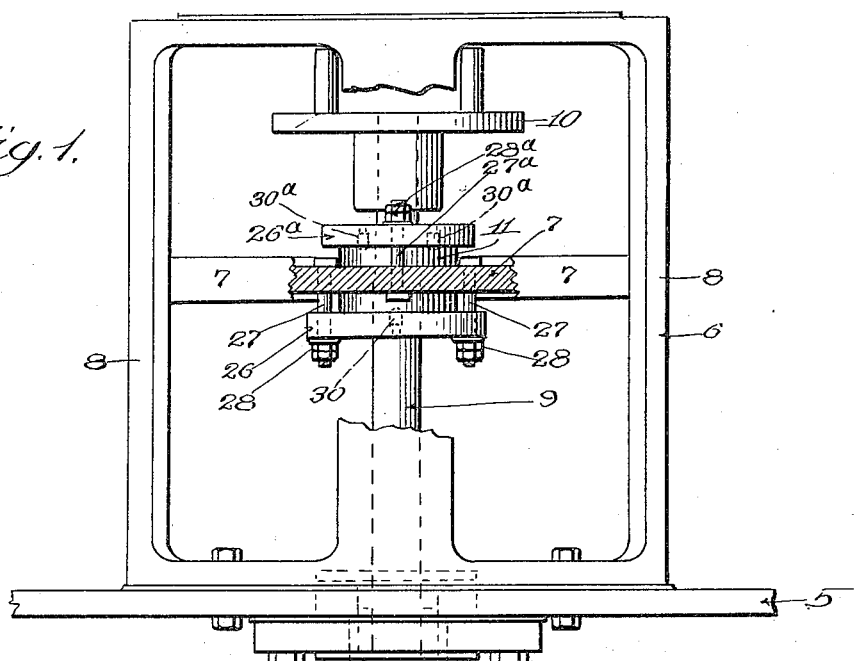

Jan. 8, 1929.

A. C. DURDIN, JR 1,698,694

ADJUSTABLE BALL BEARING MOUNTING

Filed Oct. 21, 1927

Inventor:
Augustus C. Durdin Jr.
by Charles O. Sturdy
his Atty.

Patented Jan. 8, 1929.

1,698,694

UNITED STATES PATENT OFFICE.

AUGUSTUS C. DURDIN, JR., OF CHICAGO, ILLINOIS, ASSIGNOR TO CHICAGO PUMP COMPANY, OF CHICAGO, ILLINOIS, A CORPORATION OF ILLINOIS.

ADJUSTABLE BALL-BEARING MOUNTING.

Application filed October 21, 1927. Serial No. 227,640.

This invention relates to adjustable ball bearing mountings for the shafts of pumps and other apparatus, and its principal object is to provide adjustment means for the ball bearings whereby the shaft may be adjusted lengthwise of itself without any tendency to misalign the ball bearings.

Considerable difficulty has been experienced heretofore in securing in place the relatively stationary ball race of ball bearings (after the ball race has been adjusted) without cramping the same and thereby throwing the shaft out of alignment, and various attempts have been made to overcome this obstacle. In accordance with the present invention, I provide adjustment means for the ball bearings, in which a two point contact is had upon the relatively stationary ball race, at places diametrically opposite each other whereby the usual ball bearing (which is held in a cylindrical opening) may be adjusted precisely along its own axis and without any distortion whatever.

The invention consists, therefore, in a ball bearing mounting, in which the relatively movable ball race of the ball bearing is guided to move axially in a cylindrical bore, in conjunction with adjustment means having two diametrically opposed points of contact with said ball race, whereby when the adjustment means is moved to adjust the ball race, the ball race is moved axially of itself and of the associated shaft, and thereafter positively held in any such adjusted position. The invention further consists in the several novel features hereinafter fully set forth and claimed.

Figure 2:
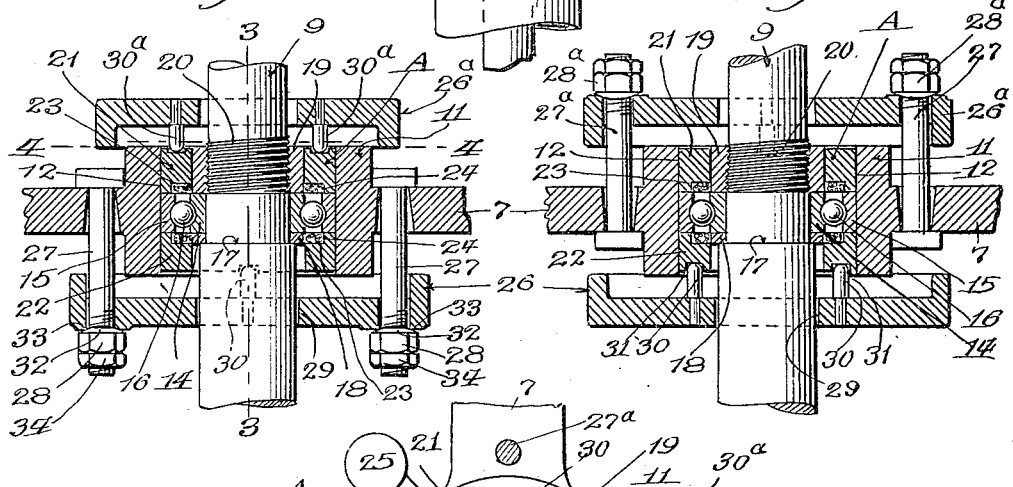
Figure 3:
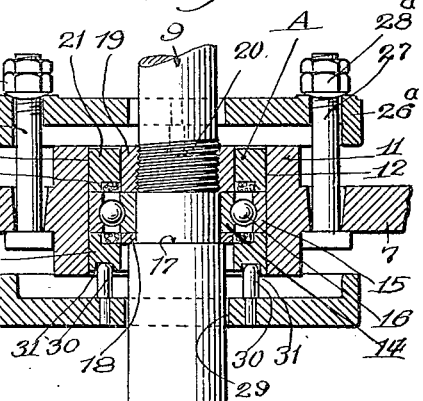
Figure 4:
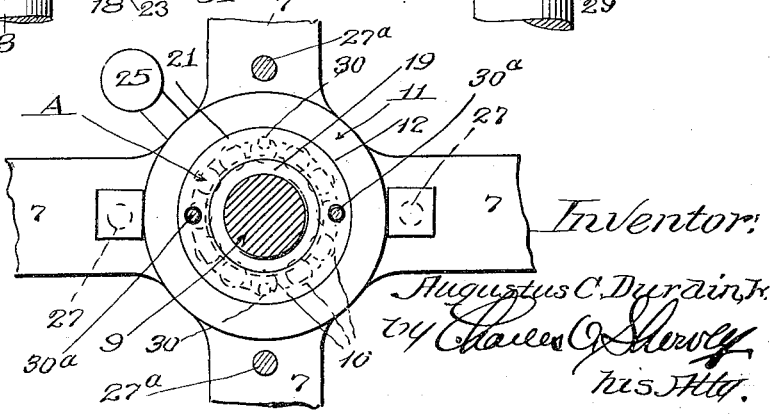

The invention is clearly illustrated in the drawing accompanying this specification, in which:

Fig. 1 is a view, partly in side elevation and partly in vertical section of a ball bearing mounting embodying a simple form of the present invention; Fig. 2 is a detail vertical cross section taken through the ball bearings; Fig. 3 is a detail, vertical, cross section taken on the line 3—3 of Fig. 2 and Fig. 4 is a detail horizontal section taken on the line 4—4 of Fig. 2.

Referring to said drawing, which illustrates one embodiment of the invention, the reference character 5 designates a base or other supporting plate upon which is mounted a shaft supporting member 6, here shown in the form of a cage like or open work structure having arms 7 radiating from a common center to the upright arms 8 of the supporting member. In the present instance the invention is illustrated as applied to the pump shaft 9 of a vertical electric motor driven pump, and said shaft has a shaft coupling 10 upon its upper end whereby it may be coupled to an electric motor (not shown) mounted upon the supporting member 6. The shaft 9 projects down below the supporting member and has the impeller of the pump (not shown) secured on its lower end. In order to properly locate the impeller in the casing of the pump, it becomes necessary to adjust the shaft along its own axis and the adjustable ball bearing mounting, forming the subject matter of this specification, is employed for that purpose.

At the intersection between the arms 7, they are formed with a boss 11, which acts as a housing for the bearing, and said boss is bored as at 12 to form a cylindrical opening for the reception of the ball bearing assembly, designated generally by the reference character A.

The ball bearings comprise the usual rotating ball race 14 which is rigidly secured to the shaft, the relatively stationary ball race 15 which fits in and is guided to move lengthwise of itself in the cylindrical opening 12, and the antifriction balls 16 between the ball races. In the form shown, the rotating ball race is secured to the shaft between a shoulder 17 thereon, and a washer 18 interposed between the ball race and shoulder and a nut 19 threadedly mounted on a threaded portion 20 of the shaft. The rotating ball race is therefore fixedly secured to the pump shaft and moves therewith.

The relatively stationary ball race is held between two collars 21, 22 which contact with the opposite sides of said ball race 15. If desired, the opposing sides of the collars may be grooved as at 23 and felt or other fibrous washers 24 may be held in said grooves and lubricating oil may be supplied to said felt washers from an oil cup 25 (see Fig. 4). The ball bearings may of course be lubricated in any suitable and approved manner.

The entire ball bearing assembly A is capable of adjustment along the true axis of the shaft, by reason of the fit between it and the cylindrical wall of the housing 11, and it is supported by an adjustment member 26 which is supported from two of the arms 7 by two diametrically opposite bolts and nuts 27, 28. The adjustment member 26 may be in the form of a disc or round plate having a central opening 29 through which the shaft extends, and said disc or plate is provided with two shoulders or bearing points 30 which are located at places diametrically opposite each other and located in a plane extending at right angles to a plane extending through the axis of the bolts 27. As a convenience the shoulders 30 may be in the form of pins secured in the disc or plate 26 and they have rounded ends that enter sockets or depressions 31 formed on the underside of the lower collar 22. The heads of the bolts 27 rest on the upper sides of the arms 7 and their threaded stems extend through holes in the disc or plate. The sides of the nuts which engage the disc or plate are made convex or spherical as at 32 and engage in concave countersunk places 33 in the disc or plate. If desired, lock nuts 34 may be provided on the bolts to lock the nuts 28 thereto.

It will be observed that by reason of the two points of engagement between the adjustment member 26, and at diametrically opposite places, with the ball bearing assembly A, either end of the adjustment member may be raised or lowered somewhat to thereby raise or lower the ball bearing assembly without throwing the shaft out of its true alignment. Consequently the workman can make the proper adjustment by first turning one nut 28 and then the other until the positions of the shaft has been fixed. The tilting of the adjustment member, such as is caused when one nut is tightened more than the other, does not cramp the ball bearings or throws them into misalignment.

On the side of the ball bearings assembly A, opposite the one on which the adjustment member 26 is located, is an adjustment member 26$^a$ similar in all essential respects to the adjustment member 26, except that its position is reversed, and its shoulders 30$^a$ bear upon the upper side of the collar 21 at diametrically opposite places located in a plane extending at right angles to the plane extending through the shoulders 30. The bolts and nuts 27$^a$, 28$^a$ and their connection between the arms 7 and disc or plate 26$^a$ are also similar to the nuts 27, 28 except that the heads of the bolts 27$^a$ engage with the underside of the arms 7 and the nuts 28$^a$ engage with the upper sides of the adjustment member 26. The bolts 27$^a$ also are disposed in a plane located at right angles to a plane passing through the bolts 27.

To adjust the shaft, the nuts 28, 28$^a$ of the bolts 27, 27$^a$ are turned in the proper directions to obtain the proper adjustment, the nuts 28$^a$ being turned down tightly against the upper adjustment member when the adjustment has been made, so as to clamp the relatively stationary collar in its adjusted position. Despite the amount of force applied to the nuts 28, 28$^a$, or either of them, the direction of force to the collars remains the same, namely along lines parallel with the axis of the shaft, and consequently the danger of cramping the bearings or misaligning them is entirely eliminated, and the shaft is enabled to rotate on its true axis.

More or less variation of the exact details of construction is possible without departing from the spirit of this invention; I desire, therefore, not to limit myself to the exact form of the construction shown and described, but intend, in the following claims to point out all of the invention disclosed herein.

I claim as new, and desire to secure by Letters Patent:

1. A ball bearing mounting, comprising in combination, a supporting member, having a cylindrical opening therein, a ball bearing assembly adjustably contained in said opening, an adjustment member having two rigid projections thereon engaging one side of said ball bearing assembly at two diametrically opposite places, and threaded connecting means adjustably connecting said supporting member with said adjustment member at places located substantially at right angles to a plane extending through said places of engagement of the adjustment member with the ball bearing assembly.

2. A ball bearing mounting, comprising in combination, a supporting member, having a cylindrical opening therein, a ball bearing assembly adjustably contained in said opening, a rockable adjustment member having two rigid shoulders engaging one side of said ball bearing assembly at two diametrically opposite places, and threaded connecting means adjustably connecting said supporting member with said adjustment member at places located substantially at right angles to a plane extending through said places of engagement of the adjustment member with the ball bearing assembly.

3. A ball bearing mounting, comprising in combination, a supporting member, having a cylindrical opening therein, a ball bearing assembly adjustably contained in said opening, a rockable adjustment member having two rigid shoulders engaging one side of said ball bearing assembly at two diametrically opposite places, bolts and nuts supportingly connecting said supporting member and adjustment member at places substantially at right angles to a plane extending through said shoulders, said nuts having convex faces bearing against the adjustment member.

4. A ball bearing mounting, comprising in combination, a supporting member having a cylindrical opening therethrough, a ball bearing assembly adjustably contained in said opening and having a relatively stationary ball race, a rotatory ball race arranged to be secured to a shaft, and antifriction balls between said ball races, an adjustment member having two rigid projections thereon engaging said ball bearing assembly at two diametrically opposite plates, and threaded supporting means adjustably connecting said supporting member with said adjustment member at two diametrically opposite places.

5. A ball bearing mounting, comprising in combination, a supporting member having a cylindrical opening therethrough, ball bearings adjustably contained in said opening and having a rotating ball race adapted to be secured to a shaft, a relatively stationary ball race and antifriction balls between said ball races, collars, one bearing against each side of the stationary ball race, an adjustment member having two diametrically opposed shoulders supportingly engaging one of said collars at two diametrically opposed places, threaded connecting means adjustably connecting said supporting member and adjustment member, and adjustment means bearing against the other collar.

6. A ball bearing mounting, comprising in combination, a supporting member, having a cylindrical opening therein, a ball bearing assembly adjustably contained in said opening, two substantially similar adjustment members, one located at one side and one at the other side of said ball bearing assembly, each adjustment member having two diametrically opposed shoulders adapted to bear against a side of a member of the ball bearing assembly, and threaded connecting members between the supporting member and adjustment members, the shoulders of one adjustment member being disposed at right angles to the shoulders of the other, and the threaded connecting members of one adjustment member being disposed at right angles to those of the other member.

7. A ball bearing mounting, comprising in combination, a supporting member, having a cylindrical opening therein, a ball bearing assembly adjustably contained in said opening, and comprising a rotatory ball race arranged to be secured to a shaft, a relatively stationary ball race, antifriction balls between said ball races and collars, one on each side of and engaging said stationary ball races, two substantially similar adjustment members, one located at one side and one at the other side of said ball bearing assembly, each adjustment member having two diametrically opposed shoulders adapted to bear against a side of a collar of the ball bearing assembly, and threaded connecting members between the supporting member and adjustment members, the shoulders of one adjustment member being disposed at right angles to the shoulders of the other, and the threaded connecting members of one adjustment member being disposed at right angles to those of the other member.

AUGUSTUS C. DURDIN, Jr.